United States Patent
Karl

[11] Patent Number: 5,924,299
[45] Date of Patent: Jul. 20, 1999

[54] MONOBLOC COMPONENT FOR A REFRIGERANT FLUID CIRCUIT, IN PARTICULAR FOR AIR CONDITIONING THE CABIN OF A MOTOR VEHICLE

[75] Inventor: Stefan Karl, Paris, France

[73] Assignee: Valeo Climatisation, LaVerriere, France

[21] Appl. No.: 08/969,440

[22] Filed: Nov. 12, 1997

[30] Foreign Application Priority Data

Nov. 12, 1996 [FR] France .................................. 96 13751

[51] Int. Cl.⁶ .................................................. F25B 41/04
[52] U.S. Cl. ............................................ 62/225; 62/324.6
[58] Field of Search ........................... 236/92 B; 62/225, 62/324.1, 324.6; 137/884

[56] References Cited

U.S. PATENT DOCUMENTS

| | | | |
|---|---|---|---|
| 2,326,093 | 8/1943 | Carter | 62/225 |
| 3,810,366 | 5/1974 | Orth | 62/217 |
| 3,842,616 | 10/1974 | Orbeson | 62/225 |
| 3,953,984 | 5/1976 | Widdowson | 62/156 |
| 4,982,572 | 1/1991 | Moore | 62/122 |
| 5,228,619 | 7/1993 | Yano | 236/92 B |
| 5,243,829 | 9/1993 | Bessler | 62/126 |

FOREIGN PATENT DOCUMENTS

| | | |
|---|---|---|
| 1087412 | 10/1980 | Canada . |
| 0 682 217 | 5/1995 | European Pat. Off. . |
| 0 733 504 | 9/1996 | European Pat. Off. . |
| 2194920 | 3/1974 | France . |
| 2717126 | 9/1995 | France . |
| 27 09 534 | 9/1977 | Germany . |

*Primary Examiner*—William E. Tapolcai
*Attorney, Agent, or Firm*—Morgan & Finnegan, L.L.P.

[57] ABSTRACT

A refrigerant fluid circuit for air conditioning a motor vehicle has three branches, including a first branch having an evaporator and a compressor, the three branches having a common junction point. The circuit includes a monobloc component comprising a body having three body ports for connection to the three branches of the circuit respectively. The common junction point is formed within the body of the monobloc component, which also contains an expansion device of the circuit, situated between the second body port and the junction point. The body also includes a direct cross passage which is connected in the first circuit branch between the evaporator and the compressor.

15 Claims, 2 Drawing Sheets

MONOBLOC COMPONENT FOR A REFRIGERANT FLUID CIRCUIT, IN PARTICULAR FOR AIR CONDITIONING THE CABIN OF A MOTOR VEHICLE

FIELD OF THE INVENTION

This invention relates to a component for a refrigerant fluid circuit, in particular a circuit for the air conditioning of the cabin of a motor vehicle. More particularly, the component is a component adapted to form part of a refrigerant fluid circuit comprising a first branch containing an evaporator followed by a compressor, a second branch containing a condenser, and a third branch containing no condenser, the said second and third branches being connected in parallel with each other so as to form, with the first branch, respectively, a cooling loop which also contains an expansion device interposed between the condenser and the evaporator, and a heating loop.

BACKGROUND OF THE INVENTION

A refrigerant fluid circuit of this type is known from French patent specification FR 2 717 126 A. In this known circuit, fluid switching means are also provided for selectively passing fluid from the first branch either into the second branch or into the third branch, means also being provided for delivery into the cabin of the vehicle air which has undergone heat exchange with the evaporator.

The above mentioned fluid switching means commonly comprises two three-way electromechanical valves. They enable the circuit to be put into three different configurations, in which it operates, respectively, as a conventional air conditioning circuit, a heating circuit and, in the third configuration, in a particular mode in which the refrigerant fluid is accumulated in the evaporator.

A disadvantage of such a circuit of known type is that it requires a large number of components, which is detrimental to standardisation, and which also increases the size of the installation.

DISCUSSION OF THE INVENTION

A main object of the invention is to overcome the above mentioned drawbacks. The invention provides such a component as is mentioned above in which several functions, which up to the present time have been provided by separate elements of the circuit, are grouped together.

According to the invention, a component for a refrigerant fluid circuit comprising a first branch containing an evaporator followed by a compressor, a second branch containing a condenser, and a third branch containing no condenser, the said second and third branches being connected in parallel with each other so as to form, with the first branch, respectively, a cooling loop which also contains an expansion device interposed between the condenser and the evaporator, and a heating loop, is characterised in that the said components comprises a monobloc element having a body formed with a first body port, a second body port and a third body port, the said body ports being adapted to be connected to the first branch, the second branch, and the third branch respectively, with all three branches having a common junction point which is defined within the body of the monobloc element, in that the expansion device is mounted within the body of the monobloc element between the second body port and the junction point, and in that the said component further has a direct cross passage which is adapted to be interposed in the first branch, between the evaporator and the compressor.

In this way, a component is provided in the form of a monobloc element which can be connected to the three branches of the circuit, and which includes within it the junction point between the three branches, together with the expansion device. In addition, the direct cross passage included in the body of the monobloc element can be interposed in the first branch of the circuit, so as to be connected firstly to the evaporator and secondly to the compressor. This gives the particular advantage that the evaporator can be connected directly to the monobloc element, through two appropriate connecting ducts.

According to a preferred feature of the invention, the first and third body ports are in communication with each other through a main passage formed in the body, and the second body port is in communication with a narrow secondary passage, access to which is controlled by the expansion device, the secondary passage being formed in the body and being open into the main passage at the junction point.

Preferably, the main passage and the narrow secondary passage together define a T-shaped configuration, which has the particular advantage that it can easily be formed by machining.

According to a further preferred feature of the invention, the first and third body ports are open respectively in two main faces of the body of the monobloc element, while the second body port is open in one of the said main faces.

Preferably, the second body port and the third body port are open in the same main face of the body of the body of the monobloc element.

According to another preferred feature of the invention, the direct cross passage is open in both main faces of the body of the monobloc element, through corresponding body ports. As a result of this, the component essentially has five body ports, three of which are open in one main face of the body of the element with the other two being open on the other, opposed, main face of the body.

According to yet another preferred feature of the invention, the expansion device comprises a thermostatically controlled valve member. Preferably, the thermostatic control is obtained by means of a heat-sensitive member mounted in the direct cross passage and coupled to the valve member of the expansion device through a control rod. In this way, the expansion device valve member is controlled according to the pressure and temperature of the refrigerant fluid flowing at the outlet of the evaporator.

Preferably, the valve member of the expansion device is a ball, acted on by a spring which is engaged by an adjustable loading member situated on a first end face of the body of the monobloc element.

The heat-sensitive member is preferably situated on a second end face of the body of the monobloc element, opposite to the said first end face.

In preferred embodiments of the invention, the circuit component which is provided in accordance with the invention also includes a non-return valve, which is preferably situated between the second body port and the expansion device. This enables the monobloc component to include a supplementary function which up to the present time has been obtained through a separate element of the circuit.

Although the non-return valve is preferably situated between the second body port and the expansion device, it may for example, alternatively, be situated between the common junction point of the three branches of the circuit and the expansion device.

Preferably, the body of the monobloc element is a machined block of metallic material, in particular an aluminium alloy.

Preferably also, the body of the monobloc element has the general form of a parallelepiped.

Further features and advantages of the invention will appear on a reading of the following detailed description of some preferred embodiments of the invention, which is given by way of non-limiting example only and with reference to the accompanying drawings.

DESCRIPTION OF PREFERRED EMBODIMENTS OF THE INVENTION

Figure 1:
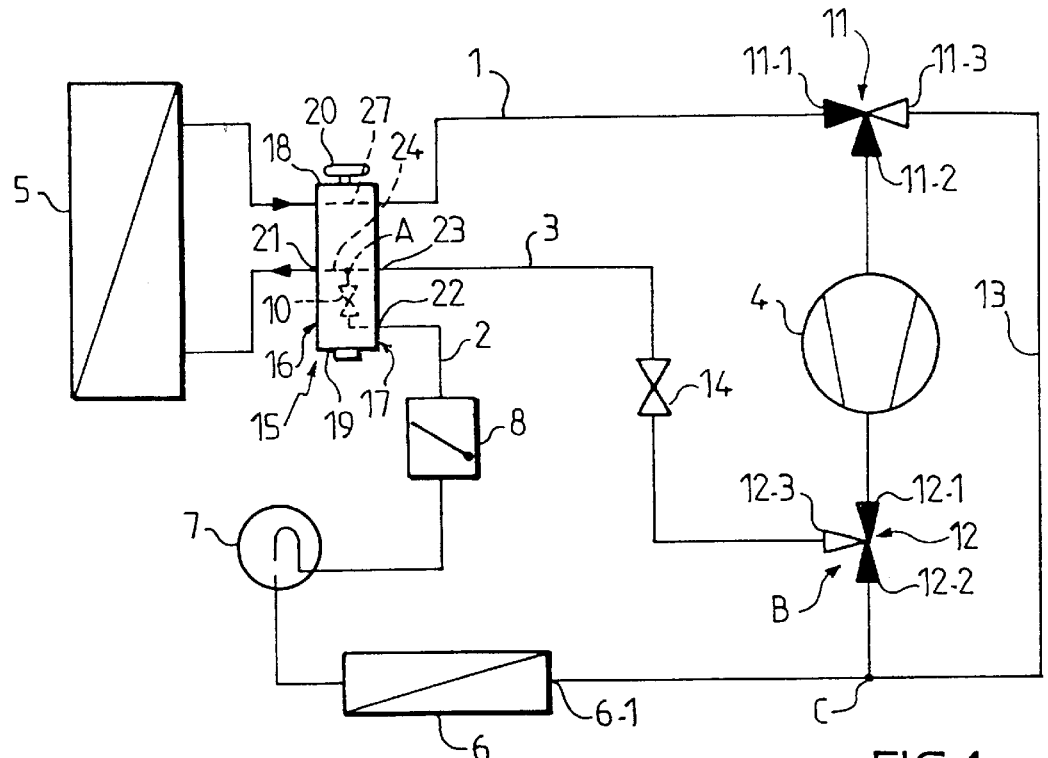
FIG. 1 is a diagram of a fluid refrigerant circuit for the air conditioning and heating of a cabin of a motor vehicle, this circuit including a modular component in accordance with the invention.

Reference is first made to FIG. 1, which shows a circuit in which there flows a refrigerant fluid, which passes from a liquid state to a gaseous state by absorbing heat, and from the gaseous state to the liquid state by yielding heat, as is usually the case in air conditioning installations for vehicles.

The circuit shown in FIG. 1 comprises three branches 1, 2 and 3, which are joined together at two junction points A and B. The branch 1 contains a compressor 4 which drives the fluid in that branch from the point A towards the point B, together with an evaporator 5 which is connected in the branch 1 upstream of the compressor. The branch 2 contains, considered from the point B towards the point A, a condenser 6, a bottle or reservoir 7, a non-return valve 8, and a first expansion device 10. A second expansion device 14 is connected in the branch 3.

A first three-way valve 11 is interposed in the branch 1, in such a way that two of its valve ports, 11-1 and 11-2, are in communication, respectively, with the outlet of the evaporator 5 and the inlet of the compressor 4. A second three-way valve 12 is located at the junction point B, so that its three valve ports 12-1, 12-2 and 12-3 are connected respectively to: the downstream end of the first branch, that is to say to the outlet of the compressor 4; to the upstream end of the second branch, that is to say to the inlet of the condenser 6; and to the upstream of the third branch, that is to say to the inlet end of the second expansion device 14. A fourth branch 13, containing no components, connects a third valve port 11-3 of the electromechanical valve 11 to an intermediate point C in the branch 2, which is located between the second valve port 12-2 of the valve 12 and the condenser 6.

The structure of the circuit in FIG. 1 is known in general terms from the above mentioned French patent specification No FR2717126A. In this circuit, the electromechanical valves 11 and 12 are controlled in co-ordination with each other in order to put the circuit into three different configurations, which are those described in the above mentioned French patent specification.

In the configuration of FIG. 1, each of the two valves 11 and 1 2 puts its valve ports 1 and 2 into communication with each other as indicated by the two black triangles for each valve in FIG. 1. The fluid then flows in a closed loop which is constituted by the branches 1 and 2, with the branch 3 and the branch 13 being isolated by the valves 12 and 11 respectively. This loop operates as a cooling loop as in a conventional air conditioning circuit, with the fluid passing from the liquid state to the gaseous state in the evaporator 5 by absorbing heat. It passes from the gaseous state to the liquid state in the condenser 6, in which it yields heat. The heat absorbed in the evaporator 5 may be taken, directly or indirectly, into a stream of air to be delivered into the cabin of the vehicle.

The circuit shown in FIG. 1 also includes a modular component 15 in the form of a monobloc element having a body which has the general form of a parallelepiped, and which is made by machining in a suitable metallic material. Preferably this is an aluminium alloy. The monobloc body has, in particular, two opposed main faces 16 and 17 in which body ports are formed. These will be described later in this description. The body of the component also has two opposed end faces 18 and 19, and the end face 18 also carries a thermostatic sensor 20.

The main face 16 includes a first body port 21 for connection to the first branch 1 of the circuit, and more particularly to the evaporator 5. The other main face 17 of the body has a second body port 22 and a third body port 23, which are connected to the branches 2 and 3 respectively of the circuit.

The body ports 21 and 23 are in communication with each other through a main passage 24 which extends in the body in an axial direction XX (see FIG. 3) at right angles to the respective planes of the main faces 16 and 17. The main passage 24 has a stepped bore, so that it has a central portion 25 of reduced diameter.

The body port 22 is in communication with a narrow secondary passage 26, access to which is controlled by the first expansion device 10, which is itself mounted within the body of the monobloc component 15. This secondary passage 26 extends in a direction YY at right angles to the above mentioned direction XX. The direction YY intersects the two end faces 18 and 19 of the body. The secondary passage 26 is open into the central portion 25 of the main passage 24, in the region of the junction point A, the passages 24 and 26 thereby defining a generally T-shaped configuration.

In addition, the body of the monobloc element 15 has a direct cross passage 27 (see FIGS. 1 to 3) which forms part of the branch 1 of the circuit as indicated in FIG. 1. The cross passage 27 extends in an axial direction ZZ parallel to the direction XX of the main passage 24. The cross passage 27 has a central portion 28 (FIG. 3), and is open in the main faces 16 and 17 of the body through two further body ports 29 and 30 (shown in FIGS. 1 and 3).

Thus the body ports 21 and 29 are situated on the main face 16 and give direct connection to the evaporator 5 as shown in FIG. 1, while the body ports 22, 23 and 30 are open in the opposite main face 17.

The expansion device 10 comprises a valve member 31 which is made in the form of a ball (FIG. 3), and which can be spaced away to a greater or lesser extent from a frustoconical seating 46, which faces in the axial direction YY, at the inlet end of the secondary passage 26. The valve member 31 is connected through a control rod 32, extending in the axial direction YY, to a heat-sensitive member 33 forming part of the sensor 20. This heat-sensitive member projects into the cross passage 27, for the purpose of governing the position of the valve member 31 according to the pressure and temperature of the fluid at the outlet of the evaporator 5. The control rod 32 passes sealingly through the body of the component 15, by means of a seal 34, which prevents any communication between the main passage 24 and the direct cross passage 27.

Figure 3:
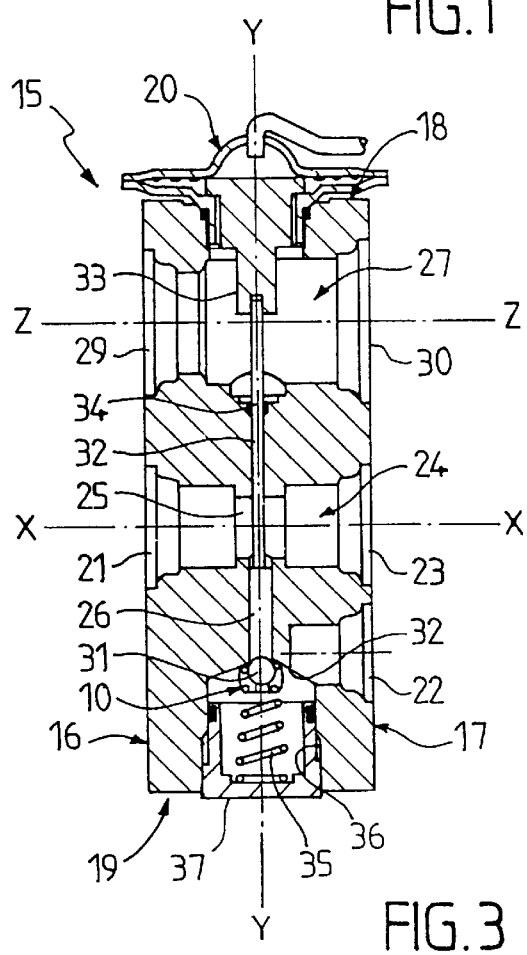
FIG. 3 is a view in cross section taken on the line III—III in FIG. 2.

The valve member 31 is acted on by a helical spring 35, one end of which is in abutment against the valve member 31. The other end of the spring 35 is loaded by an adjustable loading member 37 screwed into a ball 36 formed in the end face 19 of the body and extending in the axial direction YY (FIG. 3). This loading member 36 is accessible in the end face 19 of the body.

Figure 2:
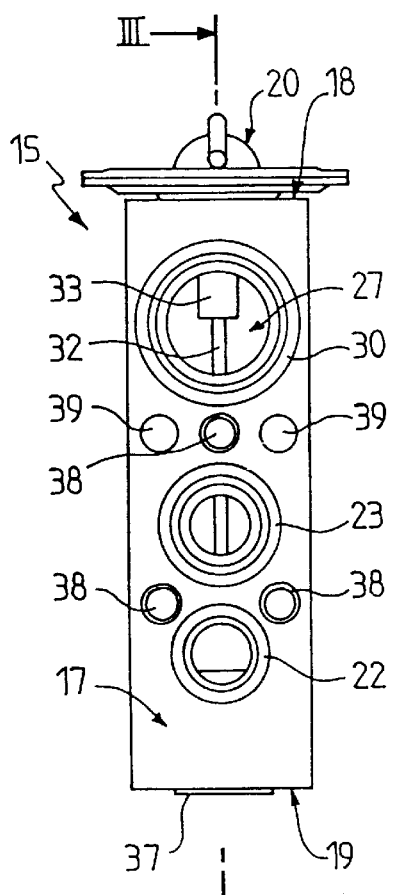
FIG. 2 is a view in elevation of the modular component, seen looking towards one of its main faces.

As can be seen in FIG. 2, the monobloc element 15 has three threaded holes 38 and two threaded holes 39, which enable flanges to the fitted to the body of the element 15 for carrying connecting tube elements (not shown) that constitute part of the branches 1, 2 and 3 respectively. The various passages, body ports and holes are formed and machined in the body of the monobloc element 15 using any appropriate tools, in the two main faces 16 and 17 and the two end faces 18 and 19.

Figure 4:
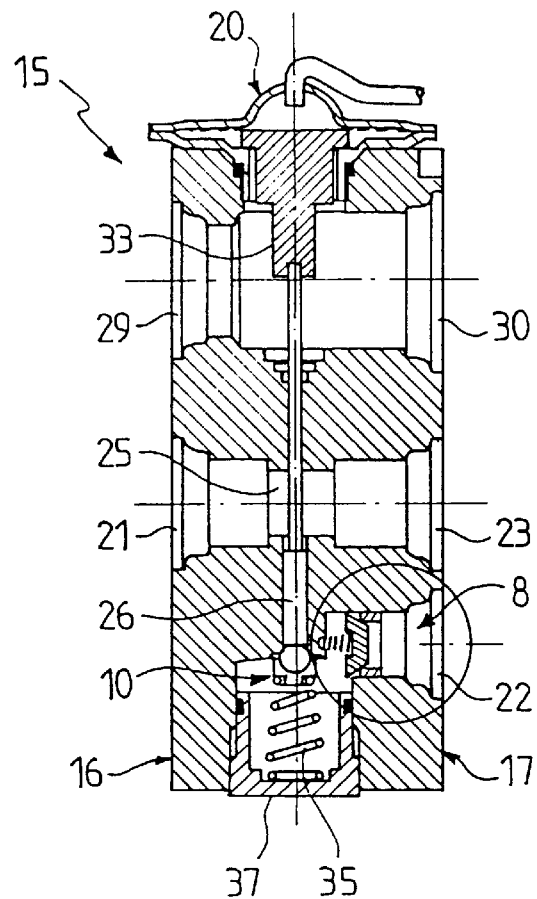
FIG. 4 is a view similar to that in FIG. 3, for a modified version of the modular component.
Figure 5:
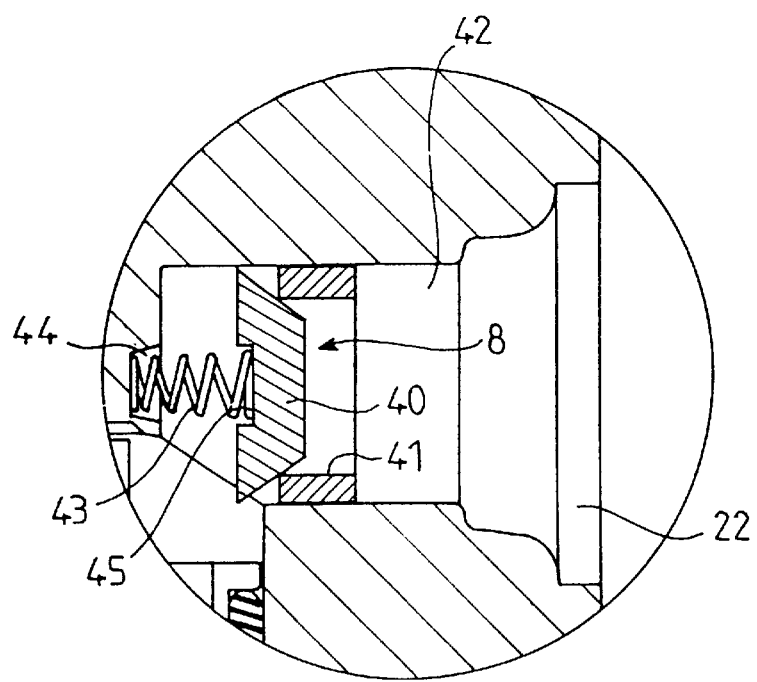
FIG. 5 is a scrap view showing on a larger scale a detail of FIG. 4.

Referring now to FIGS. 4 and 5 showing another embodiment of the invention, the monobloc element also, here, includes the non-return valve 8, which in the first embodiment shown in FIGS. 1 to 3 was a separate component of the circuit. As shown in FIG. 5, the non-return valve 8 includes a valve member 40 in the form of a piston, co-operating with a valve seat 41 of annular form which is mounted in a bore 24 communicating with the body port 22. A compression spring 43 acts on the piston 40. One end of the spring 43 bears in a recess 44 formed in the body of the monobloc element 15. The other end of the spring 43 is engaged in a corresponding recess 45 in the piston 40.

Thus, the monobloc element 15 in FIGS. 4 and 5 has the additional advantage that it incorporates the function of the non-return valve, thus eliminating the additional component in the previous embodiment.

It should be noted that the circuit of FIG. 1 operates in the same way as the circuit described in French patent specification FR 2 717 126 A.

Besides the configuration in FIG. 1, the circuit can adopt a second configuration, in which the three way valve 11 still puts its valve ports 1 and 2 into communication, but the three-way valve 12 this time puts into communication with each other the valve ports 12-1 and 12-3. The fluid then flows in a closed heating loop consisting of the branches 1 and 3, with the branch 2 and the branch 13 being isolated by the three-way valves 12 and 11 respectively. The fluid then flows through the compressor 4, the evaporator 5 and the second expansion device 14. Since it no longer passes through the condenser, the fluid remains in the gaseous state. The evaporator 5 then no longer acts as an evaporator, but continues to act as a heat exchanger, enabling a large part of the heat produced by the compression of the fluid in the compressor 4 to be dissipated. This heat can then be used for heating the cabin of the vehicle when the engine of the vehicle is cold. In particular, when the fluid flowing in the circuit is at a temperature greater than ambient, a stream of air to be delivered into the cabin can be heated directly by contact with the evaporator.

In addition, the circuit is able to adopt a third configuration in which the three-way valves provide communication, firstly between the valve ports 11-3 and 11-2, and secondly between the valve ports 12-1 and 12-3. The inlet of the compressor is then connected through the branch 13 to the normal inlet 6-1 of the condenser 6, from which it is able to take fluid in the gaseous state. This fluid then flows in the branch 3, but does not return to the condenser from the junction point A, because of the presence of the non-return valve 8. The fluid then passes into the evaporator 5, in which it is accumulated; the three-way valve 11 does not provide communication between the outlet of the evaporator 5 and the inlet of the compressor 4. The mass of fluid which will be flowing in the branches 1 and 3 after the previous configuration has been re-established is thereby augmented.

The invention is of course not limited to the embodiments described above by way of example, and it does embrace other versions. In particular, it will be understood that the various body ports in the monobloc body of the component 15 can be arranged and/or formed differently, so that the junction points between the three branches of the circuit are situated inside the monobloc component 15, with the expansion device being between the second body port and the junction element.

What is claimed is:

1. A component for a refrigerant fluid circuit comprising a first branch, a second branch and a third branch, an evaporator in said first branch, a compressor in said first branch downstream of the evaporator, a condenser in the second branch, the third branch being without any condenser, the second and third branches being in parallel with each other, whereby to constitute, with the first branch, a cooling loop and a heating loop respectively, the circuit further including an expansion device interposed in the cooling loop between the condenser and the evaporator, wherein the said component comprises a monobloc body defining a first body port, a second body port, and a third body port, for connection in said first, second and third branches of the circuit respectively with each of the said body ports defining a common junction point of the said branches within the said body, the component further including the expansion device within said body between the second body port and the said junction point, and the said body being formed with a direct cross passage for connection in the first branch of the circuit between the evaporator and the compressor.

2. A component according to claim 1, wherein the said body is further formed with a main passage connecting the said first and third body ports together, and a narrow secondary passage in communication with the second body port, the said secondary passage being open into the main passage at the said junction point, the first expansion device being associated with the said secondary passage whereby to control access to the latter.

3. A component according to claim 2, wherein the said main passage and secondary passage together define a T-shaped configuration.

4. A component according to claim 1, wherein the said body has a first main face and a second main face opposite to the first main face, the said first main face defining the first body port and the second main face defining the third body port, one of the said main faces defining the second body port.

5. A component according to claim 4, wherein the second main face defines both the second and third body ports.

6. A component according to claim 3, wherein the direct cross passage is open in both main faces of the body, each said main face defining a further body port constituting a respective end of the cross passage.

7. A component according to claim 1, wherein the said expansion device comprises a valve member and thermostatic control means coupled to the valve member, for controlling displacement of the said valve member.

8. A component according to claim 7, wherein the thermostatic control means comprise a heat-sensitive member mounted in the direct cross passage in the body, and a control rod coupling the valve member of the expansion device to the said heat-sensitive member.

9. A component according to claim 8, wherein the said body has a first end face and a second end face opposed to the said first end face, the valve member of the first expansion device being a ball, the expansion device further including an adjustable loading member mounted in said first end face of the body, and a spring bearing at one end on the said loading member and at the other end on the said ball.

10. A component according to claim 9, wherein the said heat-sensitive member is situated in the second end face of the body.

11. A component according to claim 1, further including a non-return valve.

12. A component according to claim 11, wherein the non-return valve is situated between the second body port and the first expansion device.

13. A component according to claim 11, wherein the non-return valve is situated between the common junction point of the first expansion device.

14. A component according to claim 1, wherein the said body is machined in a metallic material.

15. A component according to claim 1, wherein the said body has the form of a parallelepiped.

* * * * *